United States Patent [19]

Vos

[11] Patent Number: 4,726,459

[45] Date of Patent: Feb. 23, 1988

[54] SWIVELLING BIN-FILLING CONVEYOR

[75] Inventor: Dirk Vos, Veendam, Netherlands

[73] Assignee: Zijlstra & Bolhuis B.V., Veendam, Netherlands

[21] Appl. No.: 773,925

[22] Filed: Sep. 9, 1985

[30] Foreign Application Priority Data

Sep. 14, 1984 [NL] Netherlands ............... 8402831

[51] Int. Cl.⁴ ............................................. B65G 65/28
[52] U.S. Cl. ..................................... 198/306; 198/304; 180/65.5
[58] Field of Search ............... 198/304, 306; 180/65.5, 180/79.1, 242; 188/17, 18 A, 26

[56] References Cited

U.S. PATENT DOCUMENTS

| 2,326,857 | 8/1943 | Holstein . | |
| 3,062,329 | 11/1962 | Erickson | 188/26 X |
| 3,067,858 | 12/1962 | Loosli | 198/306 |
| 3,563,364 | 2/1971 | Arndt | 198/306 X |
| 3,746,150 | 7/1973 | Briggs | 198/304 |
| 4,271,919 | 6/1981 | Vaughan . | |
| 4,469,191 | 9/1984 | Truninger | 180/242 X |

FOREIGN PATENT DOCUMENTS 2330624 12/1975 France .
2292408 12/1975 France .

Primary Examiner—Robert J. Spar
Assistant Examiner—Lyle K. Kimms
Attorney, Agent, or Firm—Burns, Doane, Swecker & Mathis

[57] ABSTRACT

A swivelling bin-filling conveyor comprising a frame including two main wheels and a nosewheel assembly, on which frame there is mounted a conveyor extending obliquely upwardly from the frame, and which is further fitted with a foot resting, in operation, on the ground. The foot is adapted for rotation relative to the frame about a vertical axis lying in the median perpendicular plane of the connecting line between the axles of the two main wheels. The main wheels are each adapted to be brought from the normal position of travel into a swivelling operating position transverse to the connecting line between the vertical axis and the axle of the respective main wheel. Each of the two main wheels includes a separately energizable drive motor. An arrangement is provided for ensuring that at least in the swivelling operating position only the rear main wheel, as viewed in the direction of movement of the bin-filling conveyor, is driven.

13 Claims, 6 Drawing Figures

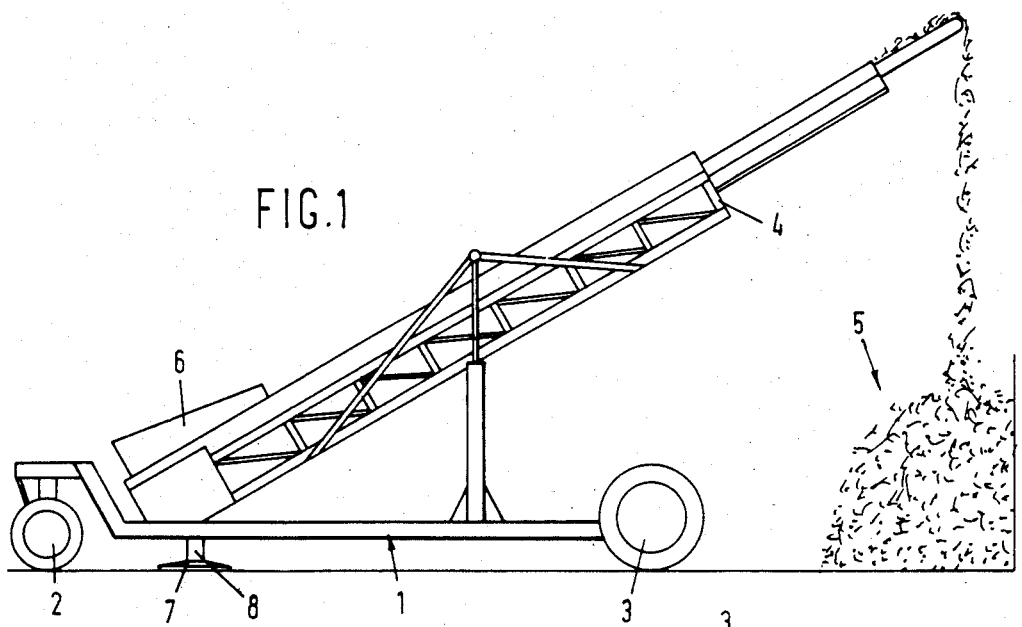
FIG. 1
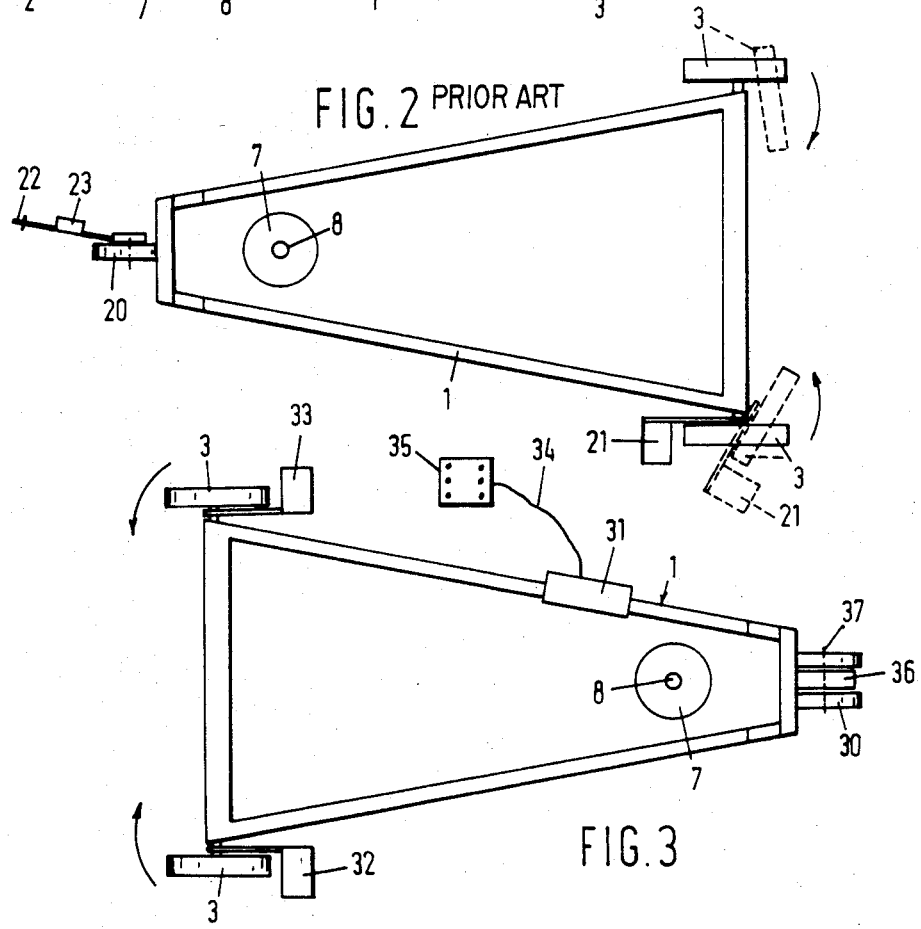
FIG. 2 PRIOR ART
FIG. 3

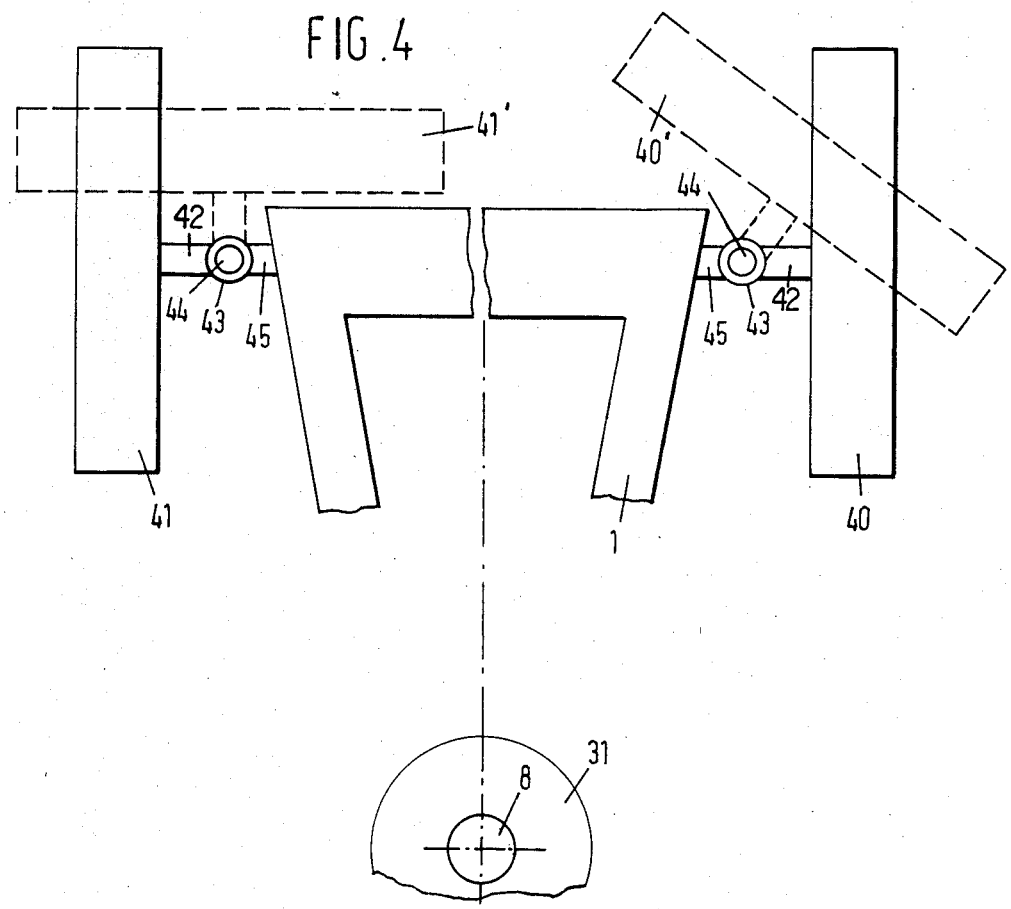
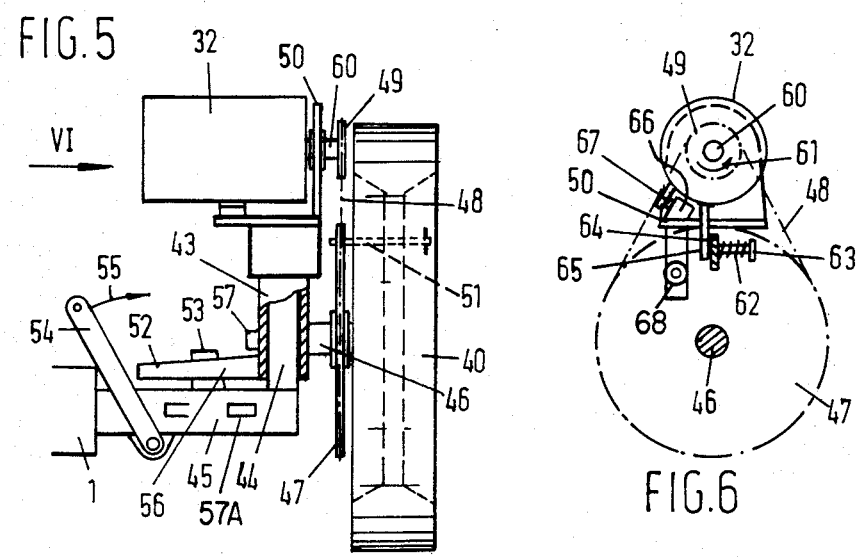

SWIVELLING BIN-FILLING CONVEYOR

The present invention relates to a swivelling bin-filling conveyor. A known machine of this type comprises a frame including two main wheels and a nosewheel assembly, on which frame there is mounted a conveyor extending obliquely upwardly from said frame, and which is further fitted with a foot resting, in operation, on the ground. Said foot is adapted to rotate relative to said frame about a vertical axis lying in the median perpendicular plane of the connecting line between the axles of the two main wheels. Said main wheels are each adapted to be brought from the normal position of travel into a swivelling operating position transverse to the connecting line between the vertical axis and the axle of the respective main wheel.

Such bin-filling conveyors or elevators are used on the farm e.g. for filling storage bins with potatoes. Other applications are also possible though.

Known from practice is a potato elevator in which one of the main wheels is driven by a hydromotor. This has the drawback that, when the machine has to be rolled forwards or backwards—which is necessary for placing the elevator in front of a bin to be filled or when, during operation, the rearward part of the bin has been filled sufficiently—the nosewheel has to be driven as well.

In the prior apparatus, therefore, the nosewheel assembly includes a drawbar serving for manual steering, on which drawbar are mounted operating means for the hydromotor. To move the known elevator e.g. backwards a short distance, because the rear part of the bin has been filled sufficiently, the nosewheel unit has to be lowered, so that the foot comes clear of the ground, and subsequently, after the main wheels have been brought into the normal position of conveyance, the machine must be manoeuvred into the correct position, by the drawbar. Thereafter the machine should be placed back on the foot. All these operations are time-consuming and relatively complicated.

It is an object of the present invention to remove the above drawback and to provide in general an effective bin-filling conveyor which can be manoeuvred in a simple manner.

To this end, according to the present invention, a bin-filling conveyor of the above described type is characterized in that each of the two main wheels includes a separately energizable drive motor, and that means are provided for ensuring that at least in the swivelling operating position only the rear main wheel, as viewed in the direction of movement of the bin-filling conveyor, is driven.

One embodiment of the bin-filling conveyor according to the present invention will now be described, by way of example, with reference to the accompanying drawings, in which:

FIG. 1 is a diagrammatic elevational view of a bin filling conveyor;

FIG. 2 is a diagrammatic top view of the rolling part of a prior art bin-filling conveyor;

FIG. 3 diagrammatically shows the rolling part of a bin-filling conveyor according to the present invention;

FIG. 4 illustrates the various possible positions of the main wheels of a bin-filling conveyor according to the present invention;

FIG. 5 is a rear view of the suspension of a main wheel of a bin-filling conveyor according to the present invention; and FIG. 6 is an elevational view according to the arrow VI of FIG. 5.

The bin-filling conveyor shown in FIG. 1 comprises an approximately triangular frame 1 including a nosewheel assembly 2 placed adjacent the apex of the triangular shape and rotatable about a vertical axis. In the embodiment shown, the nosewheel unit has a single wheel, but alternatively it may include, e.g. two juxtaposed wheels.

A main wheel 3 is mounted on each of the two other angular points of the approximately triangular frame. The main wheels are shown to be in the position for wheeling the machine backwards and forwards but can be moved into other positions, as will be further described hereinafter.

Mounted on the frame is a conveyor 4 directed obliquely upwardly, which serves for supplying articles to be deposited in a bin or other storage space, as indicated at 5. The conveyor would in most cases be extensible and is fitted at the lower end with a bin 6 wherein the articles to be moved by the conveyor can be deposited.

In operation, the conveyor is adapted to swivel in a horizontal plane so as to distribute the articles to be deposited uniformly over the storage space. For that purpose, a foot 7 mounted underneath the frame and rotatable about a vertical shaft 8 is lowered until the nosewheel assembly is clear of the ground, or the nosewheel unit is lifted until the frame rests on the foot 7 and the two main wheels. After the main wheels have been properly positioned, the frame can swivel about a vertical axis defined by the foot.

FIG. 2 is a diagrammatic top view of the frame of the above described prior art bin-filling conveyor and FIG. 3 is a corresponding view of a bin-filling conveyor according to the present invention.

In the known bin-filling conveyor, as shown in FIG. 2, only one of the main wheels is driven, i.e. by a diagrammatically shown hydromotor 21. The position of the main wheels wherein the conveyor can swivel is indicated by broken lines.

When the bin-filling conveyor is used, it often happens that it has to be rolled in a straight line backwards, because the rear part of the bin is filled. In the prior art machine, the main wheels should then be positioned manually or hydraulically in the normal rolling position, indicated by solid lines, and the foot should be retracted or the nosewheel lowered so that the machine comes to rest on three wheels.

Subsequently, the hydromotor 21 is to be energized. As only one of the main wheels is driven, the bin-filling conveyor will only be capable of rolling straight backwards when the nosewheel is steered as well. To this effect, the nosewheel connects to a drawbar 22 which mounts a control cabinet for the hydromotor.

When the bin-filling conveyor has been moved sufficiently in this manner, the frame is placed back on the foot and the main wheels are again brought hydraulically or manually into the position shown by broken lines.

These operations are rather time-consuming and entail a certain risk for the drawbar operator, since this person is necessarily close to the nosewheel assembly.

Moreover, the remote control of the hydromotor and of possible hydraulic cylinders for adjusting the position of the main wheels requires relatively expensive electromagnetically energizable hydraulic valves.

According to the present invention, these drawbacks are removed in that both main wheels have their own drive motor, as shown in FIG. 3 at 32 and 33. The drive motors are preferably electric motors, which renders remote control simpler and cheaper.

As each main wheel has its own drive motor, and moreover, as will be described hereinafter, is adapted for free swivelling motion about a vertical axis, the main wheels can be brought in a simple manner from the position shown into a position corresponding to that indicated by broken lines in FIG. 2, and vice versa, by simply energizing the two motors one after the other or simultaneously. This can be done when the bin-filling conveyor rests on the foot, and also when it rests on the nosewheel assembly. The motors preferably each have two rotation speeds, i.e. low speed for automatic swivelling and high speed for rolling.

According to a further elaboration of the present invention, it is not necessary, in case the conveyor has to be rolled forwards or backwards a short distance, to retract the foot or to lower the nosewheel assembly, at least when the machine is positioned on a flat floor, which is mostly the case. To this effect according to the present invention, the foot includes a support plate that is flat on the underside. In order to displace the bin-filling conveyor according to the present invention forwards or backwards, it will be sufficient to bring the main wheels in the normal rolling position, to block the wheels, if necessary in longitudinal direction and to let the motors run simultaneously at the high speed in the desired direction. The flat support plate then slides over the floor.

As, in this case, the nosewheel assembly need not be steered, this can be done from a safe distance by means of a control cabinet 35 connected through a cable 34 to the bin-filling conveyor.

As, according to the present invention, each main wheel has its own drive motor, even in case the machine has to be moved a larger distance, this can be effected in a relatively simple manner by means of remote control. The conveyor is then placed on the nosewheel assembly and can be manoeuvred in a simple manner by energizing one or both motors of the main wheels in the desired direction of rotation. To enable such manoeuvres, according to the present invention, the nosewheel assembly is designed as a castor wheel assembly, i.e. the nosewheel (or nosewheels) has (have) a given lag and automatically assumes (assume) the position determined by the drive of the main wheels. This can be seen in FIG. 3, in that the vertical axis 36, about which the nosewheel assembly rotates, does not lie vertically above the wheel axle 37 of the nosewheel assembly.

According to the present invention, the main wheels may occupy a third position in addition to the two positions already described. For the sake of clearness, the three possible positions are shown in top elevational view in FIG. 4.

FIG. 4 shows the main wheels at 40, 41. The axles 42 of the main wheels slightly project in the direction of the frame 1 and are fitted at their free end with a vertical bush 43, which is fitted about a vertical pin 44. Vertical pin 44 is in turn attached to the free end of an arm 35 extending laterally from the frame 1 a short distance. The normal rolling or conveyance position of the wheels is indicated by solid lines.

Shown at 40' in broken lines is the swivelling position for the main wheel 40, i.e. the wheel position required for swivelling the bin-filling conveyor about the vertical shaft 8 of the foot. In this position, the centre lines of both main wheels intersect the vertical shaft 8.

At 41' is shown by broken lines for the main wheel 41, the position occupied by both main wheels when the machine is to be moved in lateral direction.

The main wheels can be locked in the normal rolling position. This is necessary since without such locking, the main wheels would automatically occupy the swivelling position when the motors are energized. This is shown in FIG. 5, which is a diagrammatic rear view of the suspension of one of the main wheels, i.e. the main wheel 40 of FIG. 4. The other main wheel is suspended accordingly.

FIG. 5 shows the arm 45 extending outwardly from the frame 1. The vertical bearing pin 44 is disposed on the free end of the arm 45. About the bearing pin 44 there is fitted a bush 43 adapted for rotation relatively to said bearing pin. On the bush 43 there is mounted a stub shaft 46 extending horizontally outwardly in the wheel position shown, on which stub shaft the wheel 40 is mounted for rotation.

Stub shaft 46 carries a sprocket wheel 47 adapted for rotation about said stub shaft. Sprocket wheel 47 is coupled through a chain 48 to a sprocket wheel 49 mounted on the power output shaft of the motor 32. Motor 32 is suspended by the power output shaft, so that the motor can tilt to some extent. The object of this feature will be further described hereinafter. The power output shaft of the motor extends through a vertical plate 50 connected to the extension of bush 43. Sprocket wheel 47 can be coupled to the wheel 40 by means of a pin 51 extending through the rim of the wheel, the end of said pin falling into an opening in the sprocket wheel. Pin 51 has two positions, i.e. the coupling position as shown and a free position wherein the wheel is not coupled to the sprocket wheel. This free position is used when the bin-filling conveyor is towed e.g. behind a tractor on the road.

Bush 43 furthermore carries a blocking strip 52 extending towards the frame 1, said strip, in the travelling position of the main wheels, abutting against a vertical stop strip 53 fitted on the arm 45. Arm 45 further carries a lever 54 shown to be in the unlocked position and which can be swivelled about the blocking strip 52 in the direction indicated by an arrow 55. In the locked position, lever 54 rests against a projection 56 of the blocking strip.

When lever 54 and the corresponding lever of the other main wheel are in the position drawn, the bin-filling conveyor can roll straight backwards when the motors are energized in the appropriate direction. This is also the case when the main wheels are in any of the other positions shown in FIG. 4. In fact in these cases upon energization of the motors for backward travel the main wheels will first rotate about the vertical pin 44 until the blocking strips 52 abut against the stop strips 53 and subsequently will roll straight backwards. Lever 54 only needs to be brought into the locking position when the machine should be rolled forwardly. This does not occur, however, during the normal operation of the machine.

When lever 54 is in the position shown, and the motors are energized in the forward direction, the main wheels automatically occupy the swivelling position indicated at 40' in FIG. 4. To prevent the main wheels from swivelling into the position shown at 41' in FIG. 4, there is mounted a swing-away stop, schematically shown at 57A, on the arm 45 coacting with a strip-like projection 57 provided on the bush 43, said projection extending approximately at right angles to the blocking strip 52. The main wheels can be brought into the transverse position 41' by swivelling the swing-away stop aside and energizing the motors until projection 57 abuts against the rear of the stop strip 53. In order to ensure that the main wheels remain in the swivelling position or in the transverse position during the swivelling of the bin-filling conveyor or during a transverse displacement of the machine, only the motor of the rear main wheel, as viewed in the direction of movement, is energized in these operating positions.

In the operating position wherein the bin-filling conveyor performs a reciprocating swivelling movement, it is necessary therefore to switch off the one motor at the end of a swivelling stroke and to energize the other motor for performing the backward swivelling stroke. The following steps are taken to effect automatic realization of the above.

The drive motors, as shown in FIG. 5, are suspended by the power output shaft and can thus tilt about the output shaft. This is again shown diagrammatically in FIG. 6 in an elevational view from the direction indicated by an arrow VI in FIG. 5.

FIG. 6 again shows the motor 32 with the sprocket wheel 49 mounted on the power output shaft 60, said wheel being coupled through sprocket 48 to the sprocket wheel 47 mounted on the wheel axle. During the swivelling operation, the shaft 60 of the motor 32 turns in an anti-clockwise direction, as indicated by an arrow 61. Consequently, the motor tends to tilt in the opposite direction. This is counteracted by a coil spring 62 disposed between the head of a bolt 63 and a fixed plate 64 mounted on the top of the extension of bush 43.

The bolt extends through an opening in the fixed plate and is screwed onto a plate 65 attached to the underside of the motor. At the left of plate 65 there is arranged underneath the motor a switch 66 mounted on the plate 50 (see FIG. 5). The switch is a break switch and the control member 67 of the switch, during the normal operation, is kept compressed by the underside of the motor due to the force exerted by spring 62 on the motor. However, as soon as the motor is subjected to a greater resistance than normal, spring 62 is compressed by the occurring reaction force and the control member 67 of the switch is no longer compressed by the motor. The switch then interrupts the supply circuit of the motor and likewise switches on the motor associated with the other main wheel with such a direction of rotation that the swivelling movement of the bin-filling conveyor is continued in the opposite direction.

In this manner, there is obtained an effective swivelling protection, since at each obstacle encountered by the machine, the drive motor is immediately switched off and subsequently the other motor is switched on for a swivelling movement in the opposite direction. Such a protection is more reliable than the collision protection operating with light beams, reflectors and photo-electric cells, which is known for bin-filling conveyors. Such electro-optical installations as a matter of fact are highly sensitive to fouling, which may lead to substantial problems e.g. in the dusty surroundings of a potato storage bin and, moreover, they are responsive only to obstacles present in the light path. The protection according to the present invention, however, is responsive to any obstacle, including e.g. one lying on the ground.

This last property is used to set the swivelling range. For this purpose, two swivelling range limiters are supplied with the bin-filling conveyor according to the present invention, which limiters may comprise e.g. a flat plate having an upright edge. When the conveyor has been positioned, these obstacles are laid in the path of the main wheels on opposite sides of the machine. As soon as the one main wheel touches the obstacle lying in its path, the motor energized at that moment tilts, whereby said motor is switched off and the other one switched on.

According to the present invention, the switching on of the other motor may take place with some delay so as to ensure a proper distribution of the articles to be dumped. For this purpose, a retarded relay or an electronic delay member can be employed.

To prevent any tendency of the bin-filling conveyor to slip during the swivelling operation after the drive motor has been turned off, a brake is acting on each sprocket wheel 47, comprising in the embodiment shown at least one spring-biased disc of brake lining material abutting against the sprocket wheel, as diagrammatically shown at 68 in FIG. 6. In a practical embodiment, a brake disc may also be placed at the other side of the sprocket wheel, so that said wheel is clamped between two brake discs.

It is observed that the structural details shown in the figures should be considered to be examples only. Modifications of the wheel suspension shown and the associated assembly of stops and locking members, as well as of the suspension of the motor and the associated transmission are obvious to one skilled in the art in view of the above. Such modifications are deemed to fall within the scope of the present invention.

I claim:

1. A swivelling bin-filling conveyor comprising a frame including two rear main wheels, and a nosewheel assembly, on which frame there is mounted a conveyor extending obliquely upwardly from said frame, and which is further fitted with a foot resting, in operation, on the ground, said foot being adapted for rotation relative to said frame about a vertical axis, each of said main wheels being adapted to be brought from the normal position of travel into a swivelling operating position, wherein each of the two main wheels includes a separately energizeable drive motor, and suspension members for each drive motor are provided for ensuring that at least in the swivelling operating position only one of the two rear main wheels is driven, and said two main wheels are unlocked in the swivelling operation position when a single one of the two drive motors is energized, said each drive motor being suspended cantilever-fashion by a power output shaft of the motor, spring-biased members being provided which during normal operation prevent the drive motor from being tilted but allow a slight tilting motion of the drive motor as soon as an additional resistance is encountered during a swivelling movement of the conveyor, thereby to actuate an operating member of a switch mounted adjacent the drive motor whereupon said switch switches off the energization of the associated drive motor and switches on the other drive motor.

2. A swivelling bin-filling conveyor according to claim 1, wherein the nosewheel assembly is a castor wheel assembly.

3. A swivelling bin-filling conveyor according to claim 1, wherein the drive motors are electric motors.

4. A swivelling bin-filling conveyor according to claim 1, wherein the foot has a support plate that is flat on the underside.

5. A swivelling bin-filling conveyor according to claim 1, wherein each of the two main wheels, in operation, is adapted to swivel freely relative to a vertical pin mounted on an arm of the frame, and that each main wheel is adapted to coact with stop means for limiting said swivel motion in a forward direction when the swivelling operating position is reached.

6. A swivelling bin-filling conveyor according to claim 5, wherein the stop means comprise a swing-away member, and after said swing-away member has been swung away, allow a further swivelling motion until a fully transverse position of the main wheels in relation to the normal position for travel is reached.

7. A swivelling bin-filling conveyor according to claim 1, wherein the switching-on of a drive motor after the other drive motor has been switched off takes place subsequent to a predetermined delay.

8. A swivelling bin-filling conveyor according to claim 1, wherein the suspension members of each drive motor are connected to a vertical bush, the bush being connected to a stub shaft of the main wheel so that said each drive motor is swivelled with the associated wheel.

9. A swivelling bin-filling conveyor according to claim 8, wherein a first sprocket wheel is mounted on the power output shaft of each drive motor, the first sprocket wheel coupled through a chain to a second sprocket wheel mounted on the axle of the associated main wheel.

10. A swivelling bin-filling conveyor according to claim 9, wherein the second sprocket wheel is mounted on the shaft of the associated main wheel so as to be freely rotatable and that coupling means are provided for coupling the second sprocket wheel to the associated main wheel.

11. A swivelling bin-filling conveyor according to claim 10, wherein the coupling means comprise a pull-out pin extending into an opening in the rim of the main wheel, said pin being insertable through an opening in the second sprocket wheel.

12. A swivelling bin-filling conveyor according to claim 1, wherein each of the two main wheels includes a brake means which, in operation, is continuously operative.

13. A swivelling bin-filling conveyor according to claim 12, wherein the brake means comprises a spring-biased plate of brake lining material abutting against a sprocket wheel drivingly connected to the main wheel.

* * * * *